Patented Sept. 11, 1928.

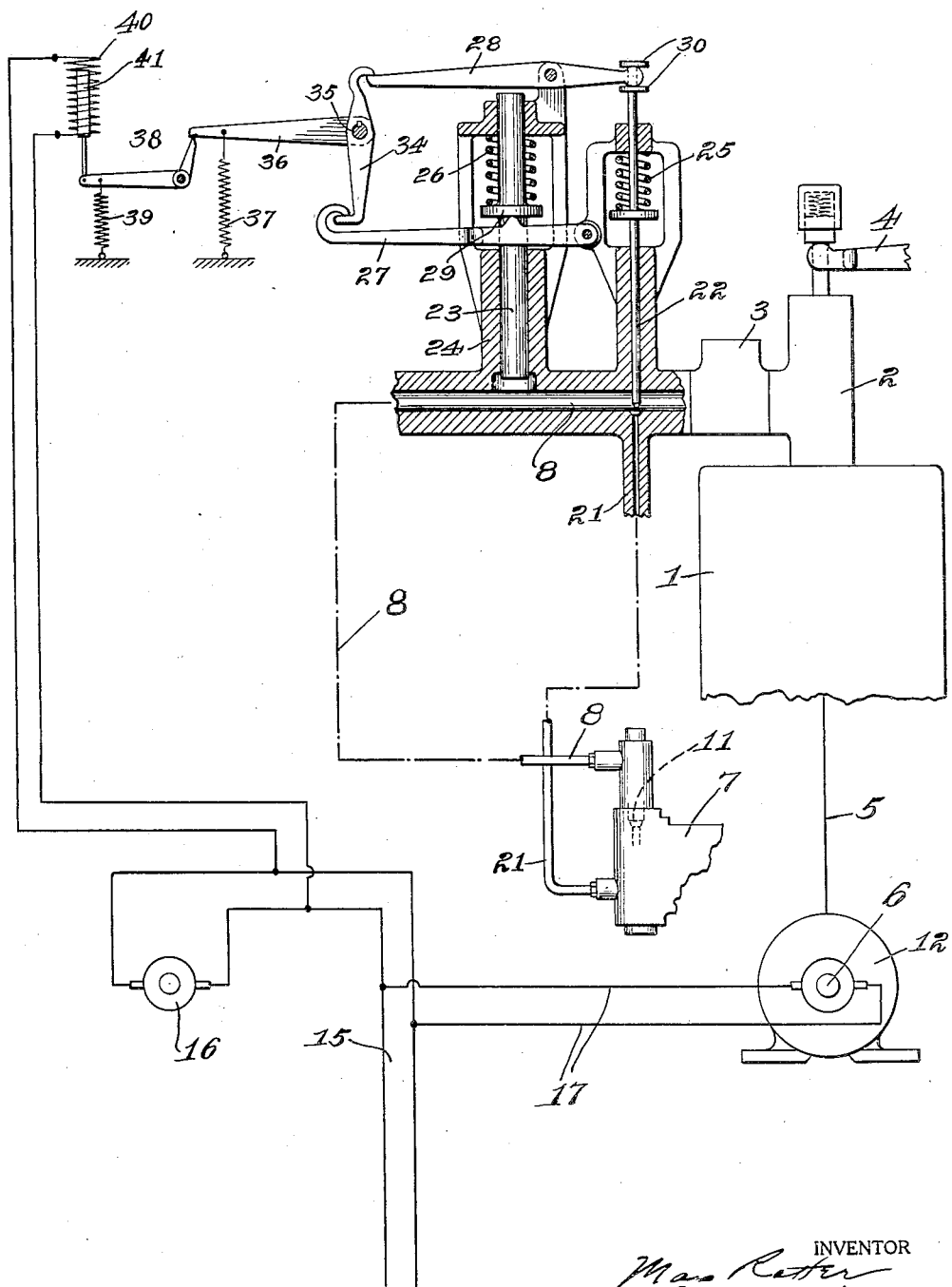

1,684,073

UNITED STATES PATENT OFFICE.

MAX ROTTER, OF MILWAUKEE, WISCONSIN, ASSIGNOR TO BUSCH-SULZER BROS.-DIESEL ENGINE CO., OF ST. LOUIS, MISSOURI, A CORPORATION OF MISSOURI.

ELECTRICAL POWER EQUIPMENT.

Application filed November 15, 1924. Serial No. 750,188.

The invention particularly concerns the use of oil engines of the injection type in electrical stand-by equipment; that is to say, in generating plants or equipments which insure the uninterrupted supply of current to a generating or transmission system by standing ready for immediate action on the failure of the normal source of supply. It is also adapted for other uses, however, as will be apparent to those skilled in this art; for example, it may be used where an additional generator is to be brought into service upon the occurrence of an overload on another or other generator units, etc. In brief the chief object of the invention is to provide an electric power plant equipment having an internal combustion engine for the prime mover, which can be promptly brought into operation when the need for it arises, together with a method of operating such plant equipment.

To the ends indicated I connect the dynamo electric machine of the equipment to the generating or transmission system so that under normal conditions,—i. e. when no electric output is required of it,—this machine operates as a motor and drives the oil engine at about its normal running speed. The fuel supply is interrupted in whole or in part at such time. The engine being in motion it is always ready for immediate initiation of its fuel operation to drive the dynamo as a generator and supply its power to the system. Further, it is usually necessary that the change-over from electric to fuel operation be accompanied by the least possible temporary reduction in the engine speed, and in some cases (as in stand-by and similar operations) the initial charge of fuel must be gotten into the engine before the engine has slowed down to a point where it is impossible for it to take up its fuel operation; also usually the speed of the engine during fuel operation ought not to be much less than the speed at which the dynamo drives it when motoring. To these ends I preferably initiate the change-over automatically by a device responding to the appropriate electrical conditions of the system, rather than through the action of the engine governor responding to a drop in the engine speed, or by hand, and I arrange to hold the oil fuel ready and free from air and vapor at a point as close as possible to the engine cylinder into which it is to be injected, and provide specially for getting the initial fuel charge into the cylinder promptly.

It may be observed from the foregoing (and will be understood better from the detailed description which follows) that the matters of holding the fuel ready and free from air and vapor close to the engine cylinder and getting the initial fuel charge into the cylinder promptly, are also pertinent to the starting of internal combustion engines of the injection type which are not directly related to electric generators.

The accompanying drawing, which is almost entirely diagrammatic in character, illustrates the invention applied to a single engine cylinder, although, as will be apparent hereafter, the invention is readily applicable without undue duplication of parts to multi-cylinder engines.

The engine cylinder is indicated at 1; a fuel injection spray valve 2 is fitted into the cylinder head and the commonly used check valve 3 is shown in the fuel line adjacent the spray valve. The oil fuel may be assumed to be injected into the cylinder 1 from the spray valve 2 with or without the use of high pressure air as desired. At 4 is indicated a conventional lifter for the fuel valve, when one is employed, and by which means the fuel charges are admitted into the cylinder at the proper time. A connecting rod of the engine is indicated at 5 and the engine crank shaft at 6. The fuel pump (engine driven) is outlined at 7, and 8 is the delivery conduit through which the fuel oil is conducted from the pump to the valve 2; the outlet valve of the fuel pump (or one of them in the case of a multi-cylinder engine) is shown in dotted lines at 11. An engine governor (not shown) may be assumed to control the delivery from the fuel pump in an ordinary way. These elements comprise the usual engine equipment and the fuel pump may be assumed to be located at some convenient place as usual, and not immediately above the cylinder it serves; in other words, the fuel charges are delivered to the injection valve or valves in the ordinary way through a system of piping. The stand-by generator 12 which this engine drives, may be assumed to be direct connected to the engine shaft 6 as indicated. The generating and transmitting system of which the engine 1 and generator 12 constitute the stand-by equipment, is indicated at 15 and may be either D. C. or A. C., single phase or polyphase. The normal source of supply of this system is shown as the generator 16. The connections between the dynamo 12 and the system lines are indicated at 17.

I have provided a fuel by-pass 21 preferably leading from a point near the check valve 3 to the suction side of the fuel pump 7. This by-pass may be closed by the needle valve 22, but when open provides for the circulation of the maximum quantity of fuel oil that the fuel pump can deliver. A fuel charging pump is also added to the engine equipment to insure the certain starting of the combustion cycle upon the calling of the stand-by equipment into action. This is constituted in the present instance by the plunger 23 and its barrel 24 which opens to the delivery conduit 8. The construction of these parts is subject to variation to suit the conditions in hand, although as will hereafter appear the purpose to be served is to retain the plunger or other fluid injection means in a position ready for activity when released and the needle valve open until such time as it is required to initiate the fuel operation of the engine when both the plunger and valve are released. According to the embodiment herein illustrated both the needle valve 22 and the plunger 23 are loaded by the springs 25 and 26 respectively, so as to respond promptly when called upon although if preferred they may be actuated otherwise as by compressed air. Normally the plunger and needle valve are sustained against their springs (the valve open and the plunger withdrawn as shown) by the levers 27 and 28, the first of which engages underneath the collar 29 on the plunger stem against which the spring 26 bears, while the lever 28 is held between the collars 30 on the stem of the needle valve. A catch lever 34 is arranged to engage the outer ends of the levers 27 and 28 to normally hold these levers in their load-sustaining positions. This catch lever is keyed to the shaft 35, to which is also keyed the shaft operating arm 36 which a spring 37 tends to move in a direction to disengage the catch lever from the levers 27 and 28. The lever 36 in turn is normally sustained against its spring 37 by the trip 38 which is subject to the opposing force of the spring 39 tending to turn the trip 38 to arm-releasing position, and the solenoid 40 and its armature 41 which tend to hold the trip in engagement with the shaft-operating arm 36. The solenoid is so connected to the system 15 as to be supplied with current and sustain its armature against the pull of the spring 39 when the normal source of current 16 is in full operation but to release its armature on a voltage drop in the system 15. For example, this solenoid may be connected across the outgoing leads of the normal supply plant as indicated.

During the stand-by period of normal operation (i. e. in the present instance while the normal source of current 16 is supplying the system 15) the parts are in the positions shown in the drawings. The solenoid 40 holds the trip 38 engaged with the shaft operating lever 36 and the latter holds the catch lever 34 engaged with the levers 27 and 28. Accordingly the plunger 23 is held retracted in its barrel and the needle valve 22 off its seat. The dynamo 12 is so connected to the generating and transmission system 15 that it operates as a motor during this stand-by period and drives the engine at about its normal fuel operating speed. The oil pump being driven by the engine, it is also in operation at the same time, but the oil it supplies is returned to the suction side of the pump by the by-pass 21. The highest motoring speed may correspond to the lowest-speed position of the engine governor, so that during the stand-by period the fuel pump is acting to deliver its maximum flow of oil and hence stands ready to instantly supply the full load requirements of the engine. The large capacity by-pass 21 of course prevents the fuel pump 7 passing any fuel into the engine. This constant circulation of the oil through the conduit 8 and the by-pass maintains the fuel pipe full of oil free from pocketed air and vapor up to the check valve 3. It may be noted at this point that a slight pocketing of air or vapor between the fuel pump and the spray valve would delay the delivery of fuel into the working cylinder when the operation is changed over from electric motoring to fuel operation, and hence might result in an undesirable drop in speed, or even cause the engine to come to a stop, unless an unreasonably heavy fly wheel were used. With the stand-by equipment thus operating under the power taken from the system 15 by the dynamo 12 acting as a motor, assume that the normal source of supply 16 fails: The drop in voltage at the normal current source 16 causes the solenoid 40 to release its pull on the armature 41 and permits the spring 39 to actuate the trip 38 and release the shaft-operating lever 36. The spring 37 then turns this lever and with it the shaft 35 and catch lever 34, and this releases the plunger and needle levers 27 and 28. Preferably the needle valve lever 28 is released slightly ahead of the plunger lever 27 (as indicated by the relative lengths of the two lever engaging points on the catch lever 34) so that the needle valve 22 closes the by-pass 21 before the plunger descends. The loadings 25 and 26 on the plunger and needle valve cause their immediate descent on the release of the levers 27 and 28 by the catch lever 34. The effect of the closing of the bypass and the descent of the plunger 23 is to impose an abnormally high pressure on the fuel in the passage 8 so as to charge the fuel valve 2 or so that on the opening of the injection valve 2 an extra heavy charge of fuel, equivalent to a full load charge or greater than such charge, is injected into the cylinder. The heavy shot of oil is very desirable to insure the starting of the combustion cycle and the engine is thereby caused to commence operating as a prime mover under the control of its governor, driving the dynamo 12 as a generator to supply electrical energy to the system 15 as intended. The engine and generator speed may now be somewhat greater than its former motoring speed, provided the highest motoring speed corresponds to a low-speed position of the engine governor as before suggested. The stand-by equipment may be removed from action when the need for its aid has passed, by re-engaging the levers 27 and 28 with the catch lever 34 and re-setting the trip 38 on the operating handle 36. Additional suitable regulating and accessory apparatus may be added to the stand-by equipment as will be obvious, but such additional apparatus being unnecessary to the understanding of the present invention, it need not be further referred to.

It will be understood moreover that the embodiment herein described and illustrated is merely exemplary and therefore subject to variation without departing from the scope of the following claims:

1. In an electric power plant equipment, the combination of an internal combustion engine of the oil injection type including the governor-controlled fuel pump and the conduit leading therefrom to an engine cylinder, a dynamo arranged to act alternately as a motor to drive said engine and as a generator driven by said engine, a by-pass for leading fuel from a point in said conduit to the suction side of the pump, and a valve for closing said conduit when the engine is to operate on fuel and drive the dynamo.

2. The combination of an internal combustion engine of the fuel injection type, its fuel pump, a dynamo connected to the engine and arranged to alternately act as a motor to drive the engine and as a generator driven by the engine, and a charging device to deliver the initial charge of fuel to a cylinder at the beginning of the fuel operation of the engine.

3. In an electric power plant equipment, the combination of an internal combustion engine of the oil injection type, its fuel pump, a dynamo arranged to act alternately as a motor to drive the engine and as a generator driven by the engine, means for holding the fuel oil ready and free from air and vapor at a point close to an engine cylinder during the operation of said dynamo as a motor, and a charging device for delivering the initial charge of said fuel at the beginning of the fuel operation of the engine.

4. In an electric power plant equipment, the combination of an internal combustion engine of the oil injection type, its fuel pump, a dynamo arranged to act alternately as a motor to drive the engine and as a generator driven by the engine, a by-pass for returning fuel oil from the outlet side of the fuel pump to the inlet side thereof, a valve for closing said by-pass, a charging plunger pump operating on the outlet side of said pump, means loading said valve and the plunger of said plunger pump for seating the valve and operating the plunger to deliver the initial fuel charge to the engine, and means sustaining said loadings while the dynamo operates as a motor and drives the engine.

5. The combination of claim 4 characterized by the fact that valve is arranged to be closed before the plunger operates.

6. In an electric power plant equipment, the combination of an internal combustion engine of the oil injection type, its fuel pump, a dynamo connected to the engine, a by-pass leading from the outlet side of the pump to the suction side thereof, a valve to close said by-pass, a fuel oil plunger to deliver the initial fuel charge to the engine, means loading said valve and plunger to cause their movement, means restraining the movement of said valve and plunger under the thrust of said loading, and means for releasing said restraining means including a solenoid.

7. In an electrical power plant system, the combination of a fuel injection type internal combustion engine, a fuel pump therefor, a dynamo connected to the engine and normally operated by the electrical system as a motor to keep the engine in motion, means for rendering the fuel pump operation ineffective to supply fuel to the engine during such normal operation and means controlled by the electrical system for rendering the fuel pump operation effective to supply fuel to the engine and thereby initiating its fuel operation whereby the dynamo is driven as a generator to supply said system.

In testimony whereof, I have signed this specification.

MAX ROTTER.